United States Patent
Jaiven et al.

(10) Patent No.: US 9,909,508 B2
(45) Date of Patent: Mar. 6, 2018

(54) AUTOMATIC COMBUSTION SYSTEM CHARACTERIZATION

(71) Applicant: General Electric Company, Schenectady, NY (US)

(72) Inventors: Rebecca Kathryn Jaiven, Schenectady, NY (US); Benjamin David Laskowski, Greenville, SC (US); Richard Lazzuri, Marietta, GA (US)

(73) Assignee: General Electric Company, Schenectady, NY (US)

( * ) Notice: Subject to any disclaimer, the term of this patent is extended or adjusted under 35 U.S.C. 154(b) by 903 days.

(21) Appl. No.: 14/316,325

(22) Filed: Jun. 26, 2014

(65) Prior Publication Data

US 2015/0377149 A1     Dec. 31, 2015

(51) Int. Cl.
   *F02C 9/28*     (2006.01)
   *F23N 5/16*     (2006.01)

(52) U.S. Cl.
   CPC ............. *F02C 9/28* (2013.01); *F23N 5/16* (2013.01); *F23N 2023/40* (2013.01);
   (Continued)

(58) Field of Classification Search
   CPC ....... F05D 2270/106; F05D 2270/1062; F05D 2270/1063; F05D 2270/1064;
   (Continued)

(56) References Cited

U.S. PATENT DOCUMENTS 7,269,953 B2 *  9/2007  Gadde .................. F01D 17/162
                                                    60/39.27
8,417,433 B2    4/2013  Gauthier et al.
(Continued)

FOREIGN PATENT DOCUMENTS

EP       1229226 A2    8/2002
EP       1724528 A1    11/2006
(Continued)

OTHER PUBLICATIONS

PCT Search Report and Written Opinion issued in connection with corresponding PCT Application No. PCT/US2015/035944 dated Aug. 18, 2015.

*Primary Examiner* — Phutthiwat Wongwian
*Assistant Examiner* — Jessica Kebea
(74) *Attorney, Agent, or Firm* — Ernest G. Cusick; Hoffman Warnick LLC (57) ABSTRACT

Aspects of the present disclosure relate generally to a system including: a computing device in communication with a combustion system, wherein the computing device is configured to perform actions including: issuing an input to the combustion system; determining whether one of a dynamic output and an emission output corresponding to the input to the combustion system exceeds a first boundary condition; and adjusting the input to the combustion system by one of a first step change and a second step change; wherein the first step change corresponds to the dynamic output and the emission output not exceeding the first boundary condition, and the second step change corresponds to one of the dynamic output and the emission output exceeding the first boundary condition, the second step change being less than the first step change.

20 Claims, 4 Drawing Sheets

(52) U.S. Cl.
CPC ............... *F23N 2041/20* (2013.01); *F23N 2900/05001* (2013.01); *F23N 2900/05003* (2013.01)

(58) Field of Classification Search
CPC ........... F05D 2270/08; F05D 2270/082; F05D 2270/083; F05D 2270/0831
See application file for complete search history.

(56) References Cited

U.S. PATENT DOCUMENTS

| | | | |
|---|---|---|---|
| 8,423,161 | B2 | 4/2013 | Wilkes et al. |
| 8,434,311 | B2 * | 5/2013 | Zhang ..................... F23N 5/003 60/39.281 |
| 8,437,941 | B2 | 5/2013 | Chandler |
| 8,452,515 | B2 | 5/2013 | Drohan et al. |
| 8,474,268 | B2 | 7/2013 | Fuller et al. |
| 8,475,160 | B2 | 7/2013 | Campbell et al. |
| 8,510,014 | B2 | 8/2013 | Nomura et al. |
| 8,516,829 | B2 | 8/2013 | Ewens et al. |
| 9,086,219 | B2 | 7/2015 | Deuker et al. |
| 2006/0260319 | A1 * | 11/2006 | Ziminsky ................ F02C 7/222 60/772 |
| 2009/0222187 | A1 * | 9/2009 | Martling ................. F02C 9/28 701/100 |
| 2010/0174466 | A1 * | 7/2010 | Davis, Jr. ............... F02C 7/22 701/100 |
| 2012/0023953 | A1 * | 2/2012 | Thomas ................. F02C 7/228 60/772 |
| 2012/0275899 | A1 | 11/2012 | Chandler |
| 2013/0042624 | A1 * | 2/2013 | Botarelli ................. F02C 9/00 60/772 |
| 2014/0277790 | A1 * | 9/2014 | Gauthier ................ G05B 15/02 700/287 |
| 2015/0159563 | A1 * | 6/2015 | Soni ....................... F02C 9/34 60/773 |
| 2017/0022907 | A1 * | 1/2017 | Argote .................... F02C 7/262 |

FOREIGN PATENT DOCUMENTS

| | | | |
|---|---|---|---|
| EP | 2239442 A2 | 10/2010 | |
| GB | 2434437 A * | 7/2007 | ............... F02C 7/228 |
| WO | WO 2010092268 A1 * | 8/2010 | ............... F02C 9/52 |

* cited by examiner

AUTOMATIC COMBUSTION SYSTEM CHARACTERIZATION

BACKGROUND OF THE INVENTION

The subject matter disclosed herein relates to characterizing combustion systems. More specifically, the present disclosure relates to systems which automatically characterize the relationship between inputs and outputs of a combustion system, such as a gas turbine.

Combustion systems, including those found in gas turbine assemblies, can generate mechanical energy by combusting a source of fuel, thereby creating mechanical power for driving a load component attached to the combustion system (e.g., by a rotatable shaft). To optimize the combustion system's performance, the relationship between different input variables and output variables of the combustion system can be "characterized." As used herein, the terms "characterize" or "characterization" refer to defining the physical relationship between inputs to a combustion system, such as relative values of combusted air, bypass air, and fuel (which may be expressed in terms of mathematical ratios) and one or more types of outputs, such as emission levels or sounds produced from the combustion system. Characterization can produce a mathematical function or model which relates one or more inputs to one or more outputs. Given the differences between individual combustion systems and their intended applications, these devices are typically characterized on a per-unit basis. One risk associated with characterizing a combustion system is that some groups of inputs may cause the combustion system or parts thereof to fail or become inoperable. These events may occur when the output variable exceeds one or more boundary conditions related to safety causes of failure.

BRIEF DESCRIPTION OF THE INVENTION

At least one embodiment of the present disclosure is described herein with reference to the automatic characterization of a combustion system. However, it should be apparent to those skilled in the art and guided by the teachings herein that embodiments of the present invention are generally applicable to other similar or related situations, such as characterizing other types of machines and turbomachinery.

A first aspect of the present disclosure provides a system including: a computing device in communication with a combustion system, wherein the computing device is configured to perform actions including: issuing an input to the combustion system; determining whether one of a dynamic output and an emission output corresponding to the input to the combustion system exceeds a first boundary condition; and adjusting the input to the combustion system by one of a first step change and a second step change; wherein the first step change corresponds to the dynamic output and the emission output not exceeding the first boundary condition, and the second step change corresponds to one of the dynamic output and the emission output exceeding the first boundary condition, the second step change being less than the first step change.

A second aspect of the present disclosure provides a program product stored on a computer readable storage medium. The computer readable storage medium can automatically characterize a combustion system and may include program code for causing a computer system to: issue an input to the combustion system; determine whether one of a dynamic output and an emission output corresponding to the input exceed a first boundary condition; and adjust the input to the combustion system by one of a first step change and a second step change; wherein the first step change corresponds to the dynamic output and the emission output not exceeding the first boundary condition, and the second step change corresponds to one of the dynamic output and the emission output exceeding the first boundary condition, the second step change being less than the first step change.

A third aspect of the present disclosure provides a system including: a combustion dynamic monitoring (CDM) system configured to monitor a dynamic output of a combustion system and replicate an emission output of the combustion system from a unit-specific emission monitor; and a characterization system in communication with the combustion system and the CDM system, wherein the characterization system is further configured to perform actions including: issuing an input to the combustion system, the input comprising one of an air-to-fuel ratio and a bypass air split ratio of the combustion system, determining whether one of the dynamic output and the emission output corresponding to the input to the combustion system exceeds a first boundary condition, and adjusting the input to the combustion system by one of a first step change and a second step change; wherein the first step change corresponds to the dynamic output and the emission output not exceeding the first boundary condition, and the second step change corresponds to one of the dynamic output and the emission output exceeding the first boundary condition, the second step change being less than the first step change.

BRIEF DESCRIPTION OF THE DRAWING

These and other features of the disclosed apparatuses will be more readily understood from the following detailed description of the various aspects of the apparatus taken in conjunction with the accompanying drawings that depict various embodiments of the invention, in which.

It is noted that the drawings are not necessarily to scale. The drawings are intended to depict only typical aspects of the disclosure, and therefore should not be considered as limiting its scope. In the drawings, like numbering represents like elements between the drawings.

DETAILED DESCRIPTION OF THE INVENTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be used and that changes may be made without departing from the scope of the present teachings. The following description is, therefore, merely exemplary.

Embodiments of the present disclosure include systems and program products for automatically characterizing a combustion system. As used herein, the term "automatically" refers to determining relationships between input and output variables to a control system by continuous, iterative selection of input variables according to predetermined rules and without inputs from a user. The present disclosure can be embodied in a computing device in communication with a combustion system, the computing device being able to perform process steps to interact with the combustion system. The computing device can issue a particular input to the combustion system and determine whether the input causes one or more output variables (e.g., a dynamic output or an emission output) of the combustion system to exceed a predetermined "boundary condition." A boundary condition refers to a threshold output, which may be chosen according to mathematical derivation and/or user preference, denoting when an output from the combustion system approaches an undesired status such as a system failure. As used herein, the term "emission" or "emissions" refers to exhaust compounds, such as gases, yielded from combustion reactions in the combustion system. The term "dynamic" or "dynamics" refers to the sounds produced from combustion reactions within the combustion system, which may be indicative of the condition of the system and/or individual parts. Dynamics can be measured in terms of the frequency, volume, etc. of sounds produced from the combustion system during operation. The computer system can adjust the value of the input by a step change based on whether the emission or dynamic output for the input exceed a corresponding boundary condition. The computer system can also include maximum and/or minimum values for each type of input, also known as "target input" values. When one or more of the "target input" values are issued or disregarded as likely to cause a system failure, the computer system can issue a different group of inputs or end the characterization process.

Figure 1:
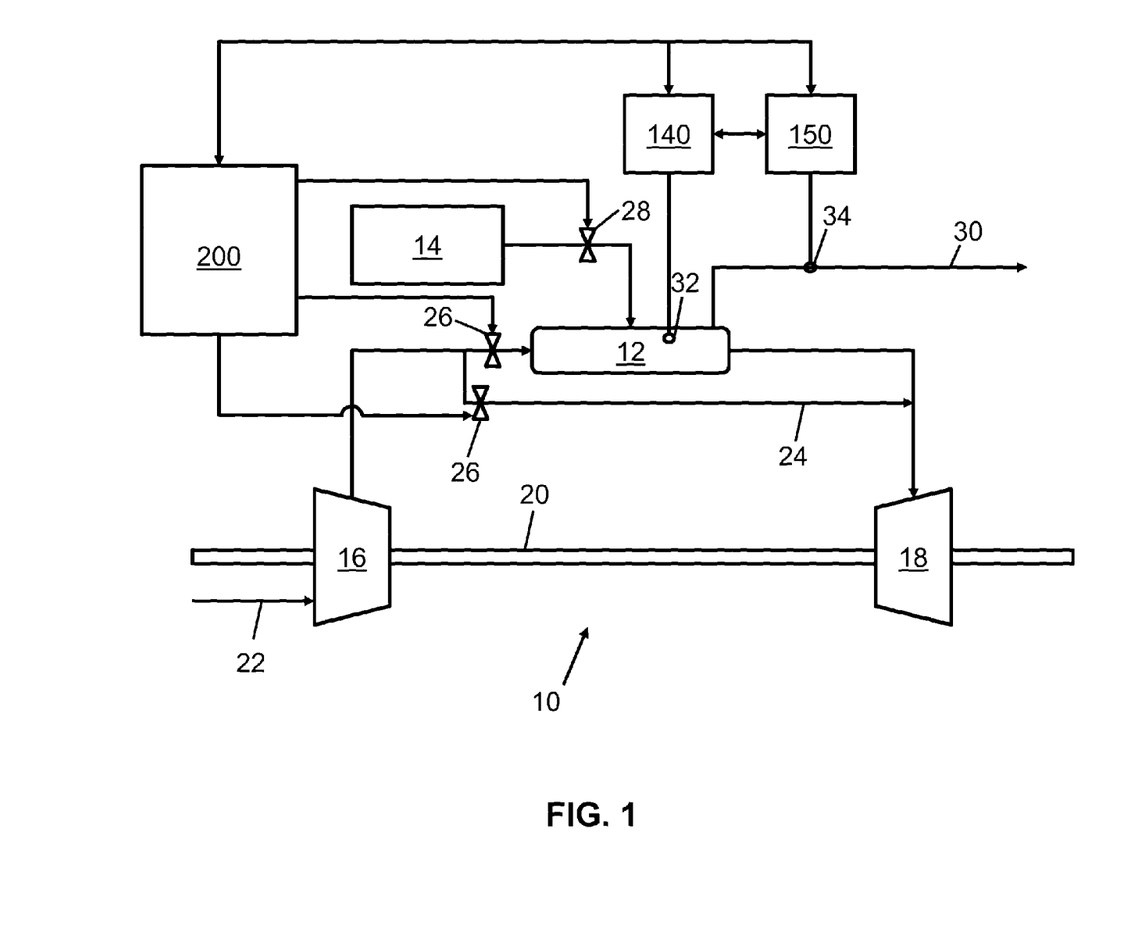
FIG. 1 is a schematic view of a system according to an embodiment of the present disclosure.

FIG. 1 shows a schematic view of a gas turbine assembly 10 according to an embodiment of the present disclosure. Gas turbine assembly 10 is an example of a combustion system with accompanying components according to the present disclosure (e.g., a computing system 200). A combustor 12, connected to one or more fuel nozzles 14, is typically located between a compressor 16 and a turbine section 18 of gas turbine assembly 10. It is thus understood that fuel nozzle 14 in the schematic of FIG. 1 may represent multiple fuel nozzles. Compressor 16 and turbine 18 can be mechanically coupled to each other through a rotatable shaft 20. Air 22 flows sequentially through compressor 16, combustor 12, and lastly through turbine 18. Air 22 can react with fuel provided from fuel nozzle 14 in combustor 12 to create a combustion reaction, which in turn yields a hot gas stream. The hot gas stream can enter turbine 18 to impart mechanical energy to rotatable shaft 20, thereby delivering power back to compressor 16 and/or any loads (not shown) coupled to rotatable shaft 20. Gas turbine assembly 10 may be one of several gas turbines within a larger system. Although gas turbine assembly 10 is described herein for the purposes of example and demonstration, it is understood that the present disclosure can be adapted for use with other types of machines, such as other types of turbine assemblies, internal combustion engines, etc.

A bypass line 24 can divert some compressed air 22 directly into turbine 18 instead of combustor 12. One or more valves 26 can control the amount of air which enters bypass line 24. The proportion of air from compressor 16 diverted to turbine 18 without entering combustor 12 can be expressed in terms of a fraction between zero and one. Valves 26 can be completely open, completely closed, or only partially opened to control the amount of air entering combustor 12 or bypass line 24. The amount of air entering combustor 12 or bypass line 24 relative to the total amount of air can be expressed as a bypass air split ratio ("split ratio"). The split ratio is one type of input which may affect the performance and/or output variables of gas turbine assembly 10, including the dynamic and/or emission outputs. More specifically, the split ratio affects the amount of combustion reactions occurring in combustor 12 during operation.

One or more fuel valves 28 can similarly control the amount of fuel delivered to combustor 12 from one or more corresponding fuel nozzles 14. Fuel valve 28 can be completely open, completely closed, or only partially opened to control the amount of fuel delivered to combustor 12. Increasing the amount of fuel supplied to combustor 12 may affect the number and magnitude of combustion reactions therein. Opening or closing valves 26 and/or fuel valve 28 can affect an air-to-fuel ratio (A/F ratio) of gas turbine assembly 10. The A/F ratio of turbine assembly is an input which changes energy and hot gas released within combustor 12 of gas turbine assembly 10. More specifically, the A/F ratio represents the mass ratio of air or oxygen provided to combustor 12 per unit of fuel from fuel nozzle 14, which may be expressed mathematically as:

$$A/F \text{ ratio} = \frac{m_{air}}{m_{fuel}}$$

With "m" denoting a value of mass. It is also understood that the A/F ratio can be expressed in terms of the number of moles of air or oxygen per number of moles of fuel provided to combustor 12 from one or more fuel nozzles 14. The effectiveness of certain A/F ratio values will depend on the reaction stoichiometry of the particular reaction occurring in combustor 12. Differing A/F ratios over a predetermined range will cause more or fewer combustion reactions to occur within combustor 12. In addition or alternatively, a single gas turbine assembly 10 may have multiple A/F ratios corresponding to multiple fuel nozzles 14, which may be controlled with respective fuel valves 28.

Changing the A/F ratio or split ratio can affect the number of combustion reactions in combustor 12, which in turn affects the level emissions and other byproducts released from combustor 12 through an emission line 30. Gas turbine assembly 10 can include sensors for detecting and/or measuring outputs corresponding to different inputs. A sensor 32 coupled to combustor 12 can measure dynamic outputs from gas turbine assembly 10. Sensor 32 can be positioned within combustor 12 or may be communicatively connected to combustor 12 by other configurations, such as sound sensors being positioned outside of combustor 12 which measure dynamic outputs from combustion reactions. Sensor 32 can include one or more parts for measuring dynamic frequencies and amplitudes, such as acoustical sensors, microphones, vibrometers, etc. Gas turbine assembly 10 can also include an emission sensor 34. Emission sensor 34 can be positioned within emission line 30, or another location for monitoring emissions exiting combustor 12 and/or gas turbine assembly 10. Emission sensor 34 can be in the form of a general-purpose gas detector, thermal conductivity detector, colorimetric detector tube, or similar device for measuring the concentration of particular substances in a stream of fluid or sample of exhaust air. Example types of emissions measured with emission sensor 34 can include, e.g., nitrogen oxide and nitrogen dioxide ($NO_x$) and/or carbon monoxide (CO). In any case, the relevant emissions can be measured in terms of total weight or relative molecular weight (e.g., moles of $NO_x$ or CO per gram of total exhaust). Emission sensor 34 can therefore include a nitrogen oxide/dioxide detector, a carbon monoxide detector, a group of individual sensors each configured to detect different types of emissions, or a single assembly for detecting multiple emission gases.

Gas turbine assembly 10 can be in communication with one or more systems for logging and storing data for characterizing gas turbine assembly 10. A combustion dynamics monitoring (CDM) system 140 can be coupled to sensor 32. CDM system 140 can include a computer system which includes or is in communication with a memory or other type of storage system. CDM system 140 can collect several data readings from sensor 32 which measure the dynamic output of gas turbine assembly 10 for a particular set of inputs. CDM system 140 can be independent of gas turbine assembly 10, and may be an off-the-shelf product (e.g., the MyFleet™ remote monitoring system available from General Electric, Inc.) or an adapted form of a generally available system. Sensor 32 may be a component of CDM system 140, or may be provided separately. CDM system 140 can be programmed to replicate data from other systems for integration (e.g., convert to the same format) with data in CDM system 140 to provide a unified source of data. In any case, CDM system 140 can track several types of dynamic outputs, including the frequency and amplitude of combustion dynamics, the operating conditions of combustor 12, and related variables. CDM system 140 can also process and manipulate the collected data and express dynamic outputs in terms of their maximum, mean, and/or median values. CDM system 140 can also compute a system-level dynamic (i.e., a dynamic output corresponding to the entire gas turbine assembly 10) from particular dynamic frequencies and/or amplitudes.

Gas turbine assembly 10 can also include an emission monitoring system (EMS) 150 coupled to emission sensor 34 and gas turbine assembly 10. EMS 150 can include a memory and/or processing unit for calculating, storing, or receiving emission data from emission sensor 34. The emission data collected and/or computed in EMS 150, e.g., $NO_x$ and CO levels, can also characterize the performance of gas turbine assembly 10 for a corresponding set of inputs. EMS 150 may be unit-specific to a particular gas turbine assembly 10 and may be configured to record data in a different format from CDM system 140. CDM system 140, however, can be adapted to exchange data with EMS 150 or send data thereto. CDM system 140 in some embodiments can replicate data from EMS 150 for storage within CDM system 140 at a centralized location. It is understood that the same replication and storage functions can also be provided in EMS 150 for collecting data from CDM system 140, if desired.

A computer system 200 can be in communication with gas turbine assembly 10. Computer system 200 can include hardware and/or software for carrying out process steps discussed herein for automatically characterizing gas turbine assembly 10. Computer system 200 can provide instructions to manipulate valves 26 and/or fuel valve 28, e.g., issuing control signals to components mechanically and/or electrically coupled to valves 26 and/or fuel valve 28. In addition or alternatively, computer system 200 can provide instructions to open or close valves 26 and/or fuel valve 28 by use of electrically activated mechanical converters. Computer system 200 can open or close valves 26 and/or fuel valve 28 based on instructions provided from computer system 200 to adjust input values. Computer system 200 can be communicatively coupled to CDM system 140 and/or EMS 150 to send and receive data related to gas turbine assembly 10. Computer system 200 can more particularly read and/or receive output data from CDM system 140 and/or EMS 150 and adjust inputs to gas turbine assembly 10 by performing method steps and/or processes described in detail herein. Computer system 200 can therefore interact with gas turbine assembly 10 to automatically characterize the performance of gas turbine assembly 10 under different conditions.

Figure 2:
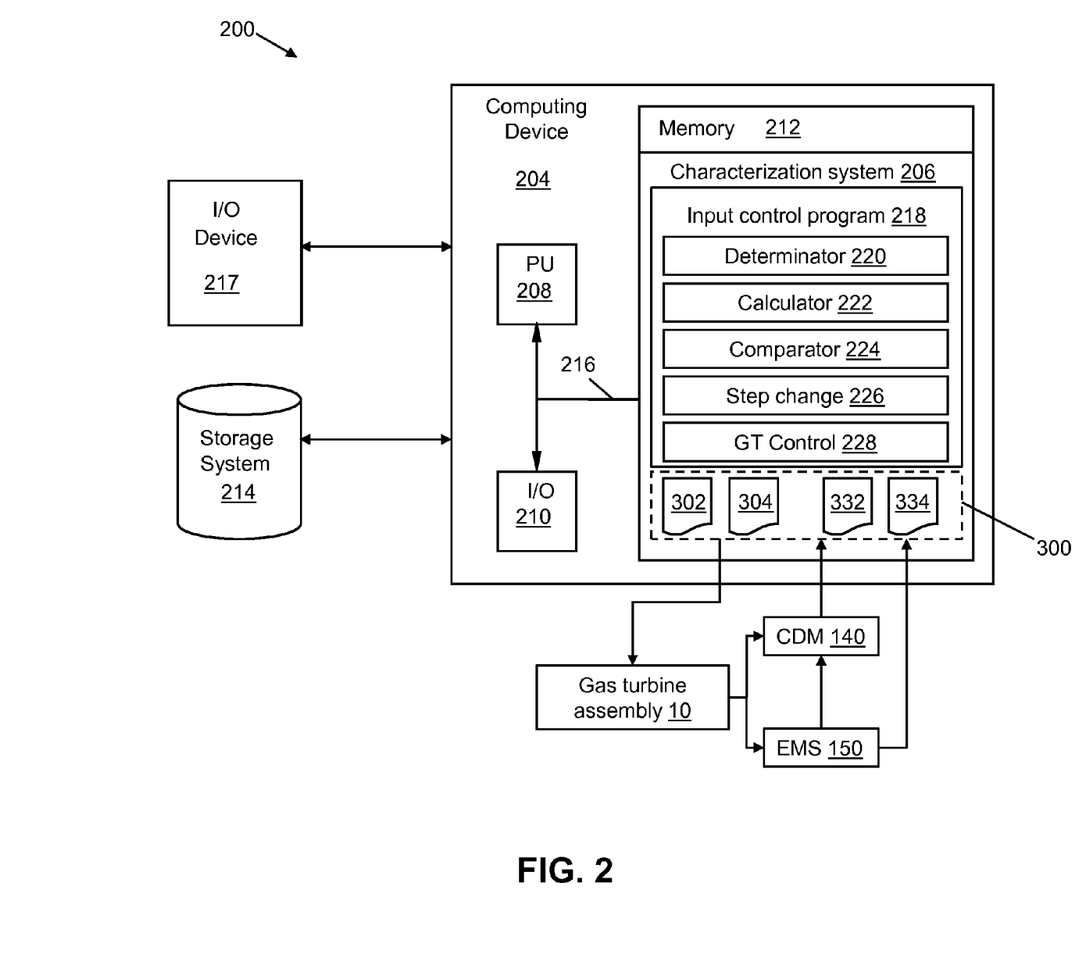
FIG. 2 is an illustrative schematic of a computer system which includes a computing device interacting with a gas turbine assembly according to an embodiment of the present disclosure.

Turning to FIG. 2, an illustrative embodiment of computer system 200 for performing the various processes described herein is shown. In particular, computer system 200 can include a computing device 204, which in turn can include a characterization system 206. The components shown in FIG. 2 are one embodiment of a system for automatically characterizing a combustion system. As discussed herein, computing device 204 can provide information (e.g., in the form of a mathematical relationship) to a user which describes the relationship between inputs and various outputs of a combustion system. Furthermore, embodiments of the present disclosure can automatically characterize a combustion system, such as gas turbine assembly 10, without requesting inputs from the user. Embodiments of the present disclosure may be configured or operated in part by a technician, computing device 204, and/or a combination of a technician and computing device 204. It is understood that some of the various components shown in FIG. 2 can be implemented independently, combined, and/or stored in memory for one or more separate computing devices that are included in computing device 204. Further, it is understood that some of the components and/or functionality may not be implemented, or additional schemas and/or functionality may be included as part of characterization system 206.

Computing device 204 can include a processor unit (PU) 208, an input/output (I/O) interface 210, a memory 212, and a bus 216. Further, computing device 204 is shown in communication with an external I/O device 217 and a storage system 214. Characterization system 206 can execute an input control program 218, which in turn can include various software components configured to perform different actions, including a determinator 220, a calculator 222, a comparator 224, a step change module 226, and/or a gas turbine control ("GT control") module 228. The various modules of characterization system 206 can use algorithm-based calculations, look up tables, and similar tools stored in memory 212 for processing, analyzing, and operating on data to perform their respective functions. In general, PU 208 can execute computer program code to run software, such as characterization system 206, which can be stored in memory 212 and/or storage system 214. While executing computer program code, PU 208 can read and/or write data to or from memory 212, storage system 214, and/or I/O interface 210. Bus 216 can provide a communications link between each of the components in computing device 204. I/O device 217 can comprise any device that enables a user to interact with computing device 204 or any device that enables computing device 204 to communicate with the equipment described herein and/or other computing devices. I/O device 217 (including but not limited to keyboards, displays, pointing devices, etc.) can be coupled to computer system 200 either directly or through intervening I/O controllers (not shown).

Memory 212 can also include various forms of data 300 pertaining to one or more machines and/or machine systems.

Input control program 218 of characterization system 206 can store and interact with data 300 in processes of the present disclosure. For example, input data field 302 can include a proposed set of inputs to gas turbine assembly 10. More specifically, input data field 302 can include a single group of inputs to be issued to gas turbine assembly 10 in one instance. Step change module 226 can adjust (i.e., increase, decrease, or set to predefined amounts) one or more of the input values of input data field 302 by predefined amounts (referred to herein as step changes) during process steps discussed herein. GT control module 228 can convert values of input data field 302 in memory 212 and/or storage system 214 to inputs into gas turbine assembly 10 in the form of digital commands, instructions, etc. Data 300 can also include an input library 304 which includes a list of particular input values. Input library 304 can be in the form of, e.g., a list of desired target inputs to gas turbine assembly 10 for particular conditions. More specifically, the values within input library 304 can include various target input values and predetermined safe states. The target input values of input library 304 can represent the minimum or maximum possible value of a split ratio, A/F ratio, or other type of input to gas turbine assembly 10. The predetermined safe states represent input values to gas turbine assembly 10 to which input data field 302 can be set after a target value is reached and/or a particular boundary condition is exceeded. As computing device 204 issues different inputs to gas turbine assembly 10, input control program 218 can "mark off" (i.e., disregard) some target input values within input library 304 as being tested or unnecessary to test. For example, when an input to gas turbine assembly 10 causes one or more corresponding outputs to exceed a boundary condition, input control program 218 can mark off a corresponding target input which would also exceed the boundary condition. Other types of data stored and used in characterization system 206 relate to outputs of gas turbine assembly 10 and are discussed elsewhere herein.

Figure 3:
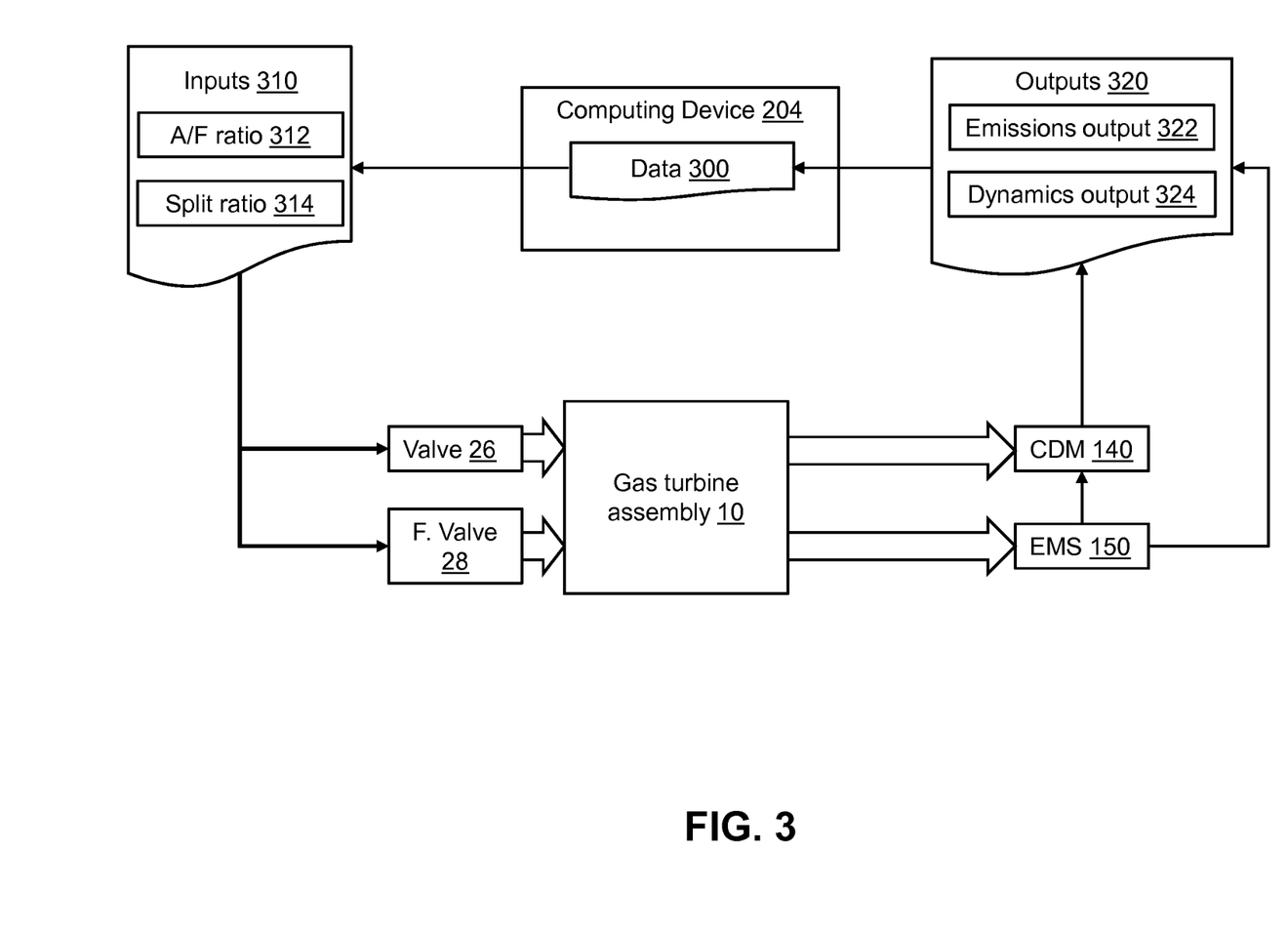
FIG. 3 provides an example data flow between a computing device and a gas turbine assembly in an embodiment of the present disclosure.

Turning to FIGS. 2 and 3 together, an example data flow between gas turbine assembly 10 and computing device 204 according to embodiments of the present disclosure is shown. GT control module 228 of input control program 218 can convert input data field 302 (FIG. 2) into inputs 310 by any currently known or later developed process for converting data into a control signal. Inputs 310 can include an A/F ratio 312 and/or split ratio 314 issued to gas turbine assembly 10. More specifically, GT control module 228 (FIG. 2) of computing device 204 can issue A/F ratio 312 and/or split ratio 314 as inputs 310 to gas turbine assembly 10. In addition or alternatively, GT control module 228 (FIG. 2) of computing device 204 can issue multiple A/F ratios 312 corresponding to multiple fuel nozzles 14 (FIG. 1) and/or fuel valves 28. Computer system 200 can convert values from input data field 302 into a signal with inputs 310 to adjust gas turbine assembly 10, e.g., by adjusting valves 26 and/or fuel valve 28. The inputs 310 issued to gas turbine assembly 10 with GT control module 228 (FIG. 2) produce corresponding outputs from gas turbine assembly 10, which in turn can be measured and/or recorded with CDM 140 and EMS 150. Adjusting A/F ratio(s) 312 and/or split ratio 314 may cause CDM 140 and/or EMS 150 to measure different outputs 320, including emission outputs 322 and/or dynamic outputs 324. Dynamic outputs 324 can include sounds (measurable, e.g., in frequency volume, etc.) produced from combustion reactions within the combustion system. In an embodiment, CDM 140 can replicate data from EMS 150 and provide both emission output 322 and dynamic output 324 to computing device 204 to be stored as data 300.

Returning to FIG. 2, comparator 224 of characterization system 206 can compare outputs 320 (FIG. 3) with one or more boundary conditions stored in boundary conditions data 332. Based on this comparison, step change module 226 can adjust values in input data 302, which in turn can be converted to another set of inputs 310 (FIG. 3). In addition or alternatively, emission and dynamic outputs 322, 324 (FIG. 3) can be combined with their corresponding input values and expressed in a vector format data field stored in a characterization vector data field 334. A "vector format data field" refers to an item of data composed of several related variables. For example, vectors stored in characterization vector data field 334 can include A/F and/or split ratio values for one input, in addition to the outputs from gas turbine assembly 10 associated with those values being used together. Values in characterization vector data field 334 can include several variables associated with a particular operating state of gas turbine assembly 10. In any case, characterization vectors can be copied, replicated, obtained, or otherwise stored within memory 212 and/or storage system 214. In an alternative embodiment, output and/or characterization vectors can include emission outputs 322 (FIG. 3) provided directly from EMS 150 and dynamic outputs 324 (FIG. 3) provided directly from CDM system 140 if desired. As discussed elsewhere herein, comparator 224 can compare outputs with different boundary conditions. Where determinator 220 determines that one or more outputs exceed a boundary condition or meet a target value, step change module 226 can adjust (i.e., increase, decrease, or set to particular amounts) values of input data field 302 to define the next input to for gas turbine assembly 10.

Computing device 204 can comprise any general purpose computing article of manufacture for executing computer program code installed by a user (e.g., a personal computer, server, handheld device, etc.). However, it is understood that computing device 204 is only representative of various possible equivalent computing devices and/or technicians that may perform the various process steps of the disclosure. In addition, computing device 204 can be part of a larger system architecture for characterizing gas turbine assembly 10.

To this extent, in other embodiments, computing device 204 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. In one embodiment, computing device 204 may include a program product stored on a computer readable storage device, which can be operative to automatically characterize gas turbine assembly 10 when executed.

Figure 4:
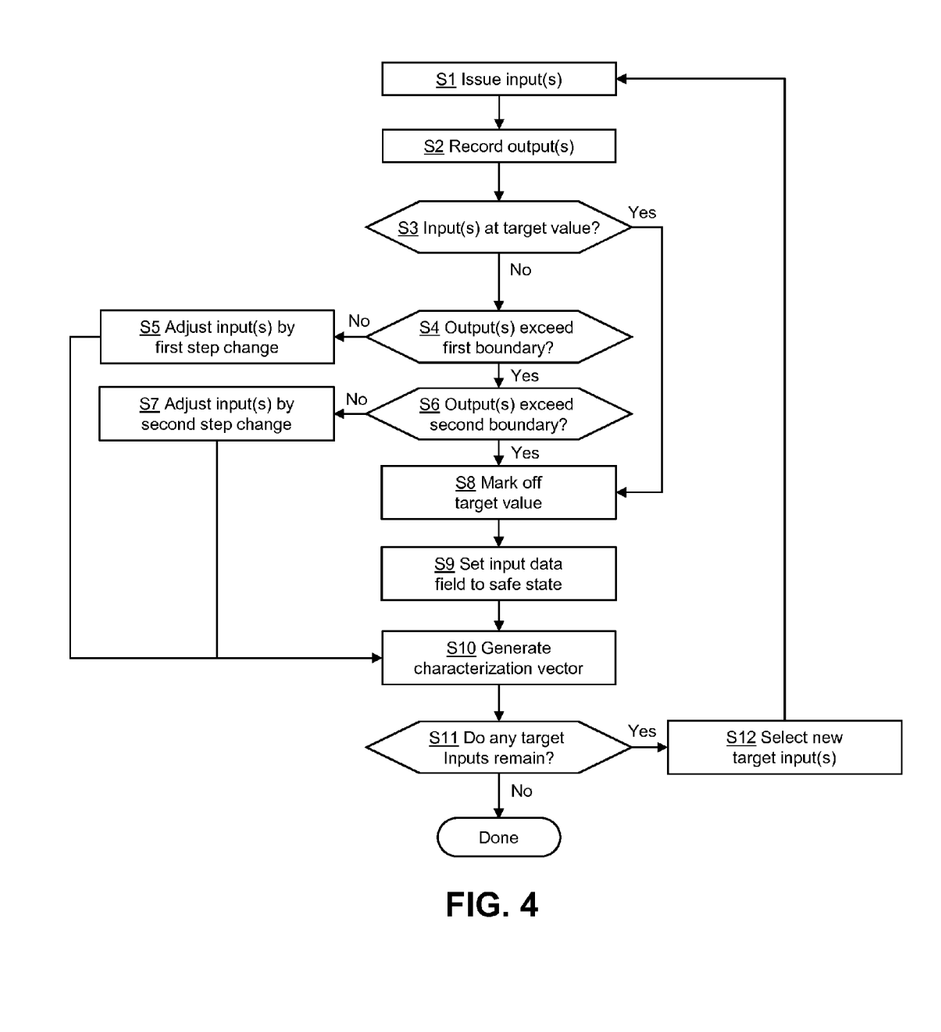
FIG. 4 depicts an illustrative flow diagram of a method according to an embodiment of the present disclosure.

Referring to FIGS. 2 and 4 together, steps for automatically characterizing a combustion system in embodiments of the present disclosure are shown. In step S1, GT control module 228 can issue inputs 310 (FIG. 3) to gas turbine assembly 10. More specifically, GT control module 228 can convert values stored in input data field 302 into inputs 310 (FIG. 3) to gas turbine assembly 10. As discussed elsewhere herein, inputs 310 (FIG. 3) can include values of one or more A/F ratios 312 (FIG. 3) and/or split ratio 314 (FIG. 3). Controller 200 issue inputs 310 (FIG. 3) by manipulating valves 26 (FIGS. 1, 3) and/or fuel valve 28 (FIGS. 1, 3) to change the split ratio and/or A/F ratio(s) to gas turbine assembly 10.

Issuing inputs 310 (FIG. 3) to gas turbine assembly 10 will cause gas turbine assembly 10 to yield a set of corresponding outputs 320. In step S2, characterization system 206 can record outputs 320 (FIG. 3) yielded from CDM 140 and/or EMS 150 as data 300. Outputs 320 (FIG. 3) can include emission outputs 322 (FIG. 3) (e.g., $NO_x$ levels and CO levels) and/or dynamic outputs 324 (FIG. 3) (e.g., frequencies and amplitudes over time, relative to gas turbine assembly 10 or a larger system). Characterization system 206 can record emission and dynamic outputs 322, 324 (FIG. 3) obtained solely from CDM system 140 in some embodiments. Inputs 310 (FIG. 3) and outputs 320 (FIG. 3) can characterize the operation of gas turbine assembly 10 under particular conditions, whether alone or in combination with other data.

In step S3, determinator 220 can determine whether one or more of the inputs issued in step S1 are equal to a particular target value, which may be stored, e.g., in input library 304. Generally, each group of inputs successively issued to gas turbine assembly 10 may be closer to a particular target value than the previous group of inputs. A user of input control program 218 may select a particular target value representing a maximum or minimum value of one or more inputs to gas turbine assembly 10. Where the inputs issued in step S1 reach a target value (i.e., "yes" at step S3), the target value can be marked off and the data of input data field 302 used to issue the next input can be set to a predetermined safe state. These steps are discussed in further detail herein (i.e., steps S9-S13).

In step S4, comparator 224 can compare outputs 320 with predetermined boundary conditions for gas turbine assembly 10. One or more boundary conditions for outputs 320 can be stored within memory 212 and/or storage system 214 as boundary conditions data 332. Boundary conditions data 332 can represent, e.g., threshold values of emission and/or dynamic outputs 322, 324 where gas turbine assembly 10 approaches a failure condition. Thus, comparator 224 can compare outputs 320 with boundary conditions data 332 to evaluate whether gas turbine assembly 10 is operating within or outside the boundary conditions. Determinator 220 can determine whether one or more outputs 320 exceed a first boundary condition. The first boundary condition can be stored within computing device 204, e.g., as part of boundary conditions data 332. The first boundary condition may be a lowest-magnitude boundary condition corresponding to outputs 320 (FIG. 3) approaching a range of inputs 310 (FIG. 3) to gas turbine assembly 10 that are either unstable or result in a failure condition. As used herein, an unstable input refers to an input which causes the outputs (e.g., emission levels or dynamic levels) of gas turbine assembly 10 to exceed predetermined safety requirements, which may be set by a user and stored, e.g., in memory 212 of computing device 204. More specifically, the first boundary condition can correspond to, e.g., a high dynamic threshold, a high emission threshold, and/or a failure condition for gas turbine assembly 10. Step change module 226 of input control program 218 can adjust (i.e., increase and/or decrease) values of input data field 302 (FIG. 3) by a predetermined step change in step S5 in response to outputs 320 (FIG. 3) not exceeding the first boundary condition (i.e., "no" at step S4). Adjusting values of input data field 302 (FIG. 3) by the first step change can move inputs 310 (FIG. 3) closer to one or more predetermined target input values stored in input library 304. The target input value can represent a maximum value of inputs 310, e.g., a 0%-100% split ratio, or more specifically can be a predicted maximum stable input value to gas turbine assembly 10.

Input control program 218 can determine in step S6 whether outputs 320 (FIG. 3) exceed a second boundary condition in response to determinator 220 determining that outputs 320 (FIG. 3) exceed the first boundary condition (i.e., "yes" at step S4). In some embodiments, boundary conditions data 332 can include a second boundary condition corresponding to a maximum magnitude of outputs 320 (FIG. 3) of gas turbine assembly 10 before failure or unstable operation. Thus, the second boundary condition can be closer to an unstable state or failure condition than the first boundary condition. Input control program 218 can adjust values of input data field 302 by a second step change in step S7 in response to determinator 220 determining that outputs 320 (FIG. 3) are below the second boundary condition (i.e., "no" at step S6). The second step change can be a smaller change than the first step change to avoid causing system failures. Although the second step change can be less than the first step change, the second step change can continue to move values in input data field 302 closer to the predetermined target value. The second step change applied in step S8 can characterize gas turbine assembly 10 at more inputs approaching unstable operation or system failure, in order to obtain more data for gas turbine assembly 10 near unstable conditions.

In step S8, one or more issued inputs may be equal a target value ("yes" at step S3) or one or more outputs may exceed the second boundary condition ("yes" at step S6). In either case, input control program 218 in step S8 can mark off one or more of the predetermined target values as being tested or disregarded. Following the marking off of a particular target value in step S8, the flow can proceed to step S9, where step change module 226 can set values of input data field 302 as equal to a predetermined safe state. The predetermined safe state represents an input value to gas turbine assembly 10 which is known or predicted to result in an output from gas turbine assembly 10 within the first and second boundary conditions. One or more predetermined safe states may be stored as a designated value in input library 304. Input library 304 can include several different safe states, and step change module 226 can set values of input data field 302 as equal to predetermined safe states that have not been issued or that a user desires. Setting values of input data field 302 to a safe state in step S9 allows the characterization of gas turbine assembly 10 to continue even when the first or second step changes applied in steps S6 or S8 would otherwise cause gas turbine assembly 10 to become unstable. Setting inputs 310 (FIG. 3) to a safe state in step S9 may increase the difference between the current values in input data field 302 and one or more other target input value(s) in input library 304. However, input control program 218 can select a remaining target input to be used as a reference for the next set of inputs and/or step changes in other steps discussed herein.

After adjusting or setting input values in step S5, S7, or S9, input control program 218 can optionally generate a characterization vector for an operating state of gas turbine assembly 10 in step S10. The characterization vector can include one or more items of data pertaining to the issuing of inputs in step S1. For example, the characterization vector can include A/F ratio(s) 312 (FIG. 3), split ratio 314 (FIG. 3), emission output 322, and/or dynamic output 324 (FIG. 3) for gas turbine assembly 10 for one issuance of inputs 310 (FIG. 3). Characterization vectors generated in step S10 can be stored, e.g., in characterization vector data field 334.

Other characterization vectors can also be generated in step S10 for later issued inputs 310 (FIG. 3), and can serve as a basis for comparing different operating states of gas turbine assembly 10.

In any case, determinator 220 can determine in step S11 whether any target inputs to gas turbine assembly 10 of input library 304 have not been marked off. Where one or more target values within input library 304 have been marked off, more operating configurations of gas turbine assembly 10 can be characterized. Where some target input values remain (i.e., "yes" at step S11), input control program 218 can select in step S12 one or more new target inputs from input library 304 that have not been marked off. After the next target value or target values are selected, the flow can return to step S1 and new inputs can be issued to gas turbine assembly 10. Where determinator 220 determines that each input and/or target input value in input library 304 has been tested or disregarded (i.e., "yes" at step S11), the method can end with respect to the particular gas turbine assembly 10 being characterized.

Technical effects of the systems and methods disclosed herein include characterizing a combustion system, such as a gas turbine, by generating a mathematical model which relates multiple inputs to multiple outputs. The embodiments discussed herein can allow hardware, software, and/or combinations thereof to automatically characterize the combustion system without intervention from a human user. In addition, the embodiments discussed herein can minimize the occurrence of system failures or unstable system operation, or eliminate these events altogether.

The various embodiments discussed herein can offer several technical and commercial advantages, some of which are discussed herein by way of example. Embodiments of the present disclosure can reduce or eliminate human error in selecting and issuing inputs to a gas turbine assembly. Specifically, embodiments of the present disclosure can avoid inputs which would result in unstable turbine operation or a system failure. Furthermore, embodiments of the method discussed herein can reduce the time needed to determine the relationship between particular inputs and the performance of the system being characterized. Automatic characterization according to the embodiments described herein can also ensure that an entire possible range of operating inputs for a particular turbine assembly are tested or otherwise accounted-for (e.g., marked off). These advantages can lead to reduced testing times, as well as lower fuel and personnel costs. Embodiments of the present disclosure also provide systems and methods for integrating data from different, non-integrated systems of measuring outputs, e.g., combustion dynamic monitoring systems and emission monitoring systems. More specifically, embodiments of the present disclosure can provide a single characterization process for both emission and dynamics outputs by integrating data from different monitoring systems with different formats into a single, unified field.

The terminology used herein is for the purpose of describing particular embodiments only and is not intended to be limiting of the disclosure. As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "configured," "configured to" and/or "configured for" can refer to specific-purpose features of the component so described. For example, a system or device configured to perform a function can include a computer system or computing device programmed or otherwise modified to perform that specific function. In other cases, program code stored on a computer-readable medium (e.g., storage medium), can be configured to cause at least one computing device to perform functions when that program code is executed on that computing device. In these cases, the arrangement of the program code triggers specific functions in the computing device upon execution. In other examples, a device configured to interact with and/or act upon other components can be specifically shaped and/or designed to effectively interact with and/or act upon those components. In some such circumstances, the device is configured to interact with another component because at least a portion of its shape complements at least a portion of the shape of that other component. In some circumstances, at least a portion of the device is sized to interact with at least a portion of that other component. The physical relationship (e.g., complementary, size-coincident, etc.) between the device and the other component can aid in performing a function, for example, displacement of one or more of the device or other component, engagement of one or more of the device or other component, etc.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
a computing device in communication with a combustion system, wherein the computing device is configured to perform actions including:
issuing an input to the combustion system, the input comprising one of an air-to-fuel ratio or a bypass air split ratio of the combustion system;
determining whether one of a dynamic output or an emission output corresponding to the input to the combustion system exceeds a first boundary condition; and
adjusting the input to the combustion system by one of a first step change or a second step change; wherein the first step change corresponds to the dynamic output and the emission output not exceeding the first boundary condition, and the second step change corresponds to one of the dynamic output or the emission output exceeding the first boundary condition, the second step change being less than the first step change.

2. The system of claim 1, wherein the computing device is further configured to generate a characterization vector including the input, the dynamic output, and the emission output for the combustion system, wherein the characterization vector corresponds to an instance of issuing the input.

3. The system of claim 1, wherein the air-to-fuel ratio is calculated respect to a plurality of fuel nozzles.

4. The system of claim 1, wherein the dynamic output includes one of a maximum combustion dynamic, a mean combustion dynamic, a median combustion dynamic, a system-level dynamic, or a dynamic frequency.

5. The system of claim 1, wherein the emission output includes one of a nitrogen oxide ($NO_x$) level, an unburned hydrocarbons (UHC) level, or a carbon monoxide (CO) level.

6. The system of claim 1, wherein the first boundary condition comprises one of a high dynamic threshold, a high emission threshold, or a failure condition.

7. The system of claim 1, wherein the computing device is further configured to perform actions including:
   determining whether one of the dynamic output or the emission output exceeds a second boundary condition; and
   setting the input to a safe state without adjusting the input by one of the first step change or the second step change in response to one of the dynamic output and the emission output exceeding the second boundary condition.

8. The system of claim 1, wherein the dynamic output is monitored with a combustion dynamic monitoring (CDM) system, and the emission output is monitored with a unit-specific emission monitor.

9. The system of claim 8, wherein the computing device is further configured to replicate the emission output from the unit-specific emission monitor, and integrate the replicated emission output into the CDM system.

10. The system of claim 1, wherein the adjusting of the input by one of the first step change and the second step change decreases a difference between a target value and the input.

11. A program product stored on a non-transitory computer readable storage medium for automatically characterizing a combustion system, the non-transitory computer readable storage medium comprising program code for causing a computer system to:
   issue an input to the combustion system, the input comprising one of an air-to-fuel ratio or a bypass air split ratio of the combustion system;
   determine whether one of a dynamic output or an emission output corresponding to the input exceed a first boundary condition; and
   adjust the input to the combustion system by one of a first step change or a second step change; wherein the first step change corresponds to the dynamic output and the emission output not exceeding the first boundary condition, and the second step change corresponds to one of the dynamic output or the emission output exceeding the first boundary condition, the second step change being less than the first step change.

12. The program product of claim 11, further comprising program code for causing the computer system to generate a characterization vector including the input, the dynamic output, and the emission output for the combustion system, wherein the characterization vector corresponds to an instance of issuing the input.

13. The program product of claim 11, wherein the air-to-fuel ratio is calculated with respect to a plurality of fuel nozzles.

14. The program product of claim 11, wherein the dynamic output includes one of a maximum combustion dynamic, a mean combustion dynamic, a median combustion dynamic, a system-level dynamic, or a dynamic frequency.

15. The program product of claim 11, wherein the emission output includes one of a nitrogen oxide ($NO_x$) level, an unburned hydrocarbons (UHC) level, or a carbon monoxide (CO) level.

16. The program product of claim 11, wherein the first boundary condition comprises one of a high dynamic threshold, a high emission threshold, or a failure condition.

17. The program product of claim 11, further comprising program code for causing the computer system to:
   determine whether one of the dynamic output or the emission output exceeds a second boundary condition; and
   set the input to a safe state without adjusting the input by one of the first step change or the second step change in response to one of the dynamic output or the emission output exceeding the second boundary condition.

18. The program product of claim 11, wherein the dynamic output is monitored with a combustion dynamic monitoring (CDM) system, and the emission output is monitored with a unit-specific emission monitor.

19. The program product of claim 18, further comprising program code for causing the computer system to replicate the emission output from the unit-specific emission monitor and integrate the replicated emission output into the CDM system.

20. A system comprising:
   a combustion dynamic monitoring (CDM) system configured to monitor a dynamic output of a combustion system and replicate an emission output of the combustion system from a unit-specific emission monitor; and
   a characterization system in communication with the combustion system and the CDM system, wherein the characterization system is further configured to perform actions including:
   issuing an input to the combustion system, the input comprising one of an air-to-fuel ratio or a bypass air split ratio of the combustion system,
   determining whether one of the dynamic output or the emission output corresponding to the input to the combustion system exceeds a first boundary condition, and
   adjusting the input to the combustion system by one of a first step change or a second step change; wherein the first step change corresponds to the dynamic output and the emission output not exceeding the first boundary condition, and the second step change corresponds to one of the dynamic output or the emission output exceeding the first boundary condition, the second step change being less than the first step change.

* * * * *